United States Patent
Streeter et al.

(10) Patent No.: US 9,191,623 B2
(45) Date of Patent: Nov. 17, 2015

(54) TRANSMITTING DATASTREAMS TO LATE JOINING BROADCAST SUBSCRIBERS

(75) Inventors: Kevin Streeter, San Francisco, CA (US); Stephen Cheng, Foster City, CA (US); Wesley McCullough, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 2101 days.

(21) Appl. No.: 12/335,488

(22) Filed: Dec. 15, 2008

(65) Prior Publication Data

US 2013/0198789 A1 Aug. 1, 2013

(51) Int. Cl.
*H04N 7/173* (2011.01)
*H04N 21/472* (2011.01)
*H04N 21/6405* (2011.01)
*H04N 21/845* (2011.01)

(52) U.S. Cl.
CPC ......... *H04N 7/173* (2013.01); *H04N 21/47202* (2013.01); *H04N 21/6405* (2013.01); *H04N 21/8456* (2013.01)

(58) Field of Classification Search
CPC .......... H04N 21/2181; H04N 21/2187; H04N 21/222; H04N 21/2225; H04N 21/231; H04N 21/23103; H04N 21/23106; H04N 21/23109; H04N 21/23116; H04N 21/2385; H04N 21/262
USPC ............. 725/86, 87, 91–92, 94–96, 101, 103, 725/114–115
See application file for complete search history.

(56) References Cited

U.S. PATENT DOCUMENTS

| | | | | |
|---|---|---|---|---|
| 6,308,228 | B1* | 10/2001 | Yocum et al. .................. 710/52 |
| 6,502,139 | B1* | 12/2002 | Birk et al. ..................... 709/233 |
| 6,993,787 | B1* | 1/2006 | Kamel et al. .................. 725/94 |
| 7,080,400 | B1* | 7/2006 | Navar ........................... 725/139 |
| 7,133,922 | B1 | 11/2006 | She et al. |
| 7,143,431 | B1* | 11/2006 | Eager et al. ................... 725/101 |
| 7,404,201 | B2* | 7/2008 | Takeuchi et al. .............. 725/109 |
| 7,565,681 | B2* | 7/2009 | Ngo et al. ..................... 725/135 |
| 7,797,440 | B2* | 9/2010 | Ganesan et al. .............. 709/231 |
| 2002/0078174 | A1* | 6/2002 | Sim et al. ...................... 709/219 |
| 2002/0124262 | A1* | 9/2002 | Basso et al. ................... 725/109 |
| 2002/0154892 | A1* | 10/2002 | Hoshen et al. ................. 386/87 |
| 2002/0157103 | A1* | 10/2002 | Song et al. ..................... 725/97 |
| 2005/0183120 | A1* | 8/2005 | Jain et al. ....................... 725/46 |
| 2007/0154169 | A1* | 7/2007 | Cordray et al. ................. 386/83 |
| 2007/0157249 | A1* | 7/2007 | Cordray et al. ................ 725/58 |
| 2009/0178063 | A1* | 7/2009 | Maffeis ......................... 719/328 |

(Continued)

OTHER PUBLICATIONS

Shetty et al.; U.S. Appl. No. 11/263,652, filed Oct. 31, 2005, entitled Network Configuration with Smart Edge Servers, 37 pages, to be published by USPTO (M119).

(Continued)

*Primary Examiner* — An Son P Huynh
(74) *Attorney, Agent, or Firm* — Finch & Maloney PLLC

(57) ABSTRACT

A computer-implemented method performed by a server including obtaining a stream of live data comprising a plurality of segments; storing the plurality of segments to form a recorded stream; transmitting the plurality of segments as a near-live feed to one or more nodes in a network; transmitting the recorded stream to another node in the network; and transitioning from transmission to the another node of the recorded stream to the near-live feed, the transmission comprising: delaying transmission of the near-live feed to the another node until a new segment of the stream of live data is obtained.

24 Claims, 5 Drawing Sheets

(56) References Cited

U.S. PATENT DOCUMENTS

| | | | |
|---|---|---|---|
| 2009/0235309 A1* | 9/2009 | Roe | 725/39 |
| 2009/0328115 A1* | 12/2009 | Malik | 725/93 |
| 2010/0175090 A1* | 7/2010 | Cordray | 725/58 |
| 2011/0176787 A1* | 7/2011 | DeCamp | 386/241 |

OTHER PUBLICATIONS

Shetty et al.; U.S. Appl. No. 11/527,817, filed Sep. 27, 2006, entitled Automatic Live Stream Trees, 20 pages, to be published by USPTO (M129).

* cited by examiner

TRANSMITTING DATASTREAMS TO LATE JOINING BROADCAST SUBSCRIBERS

TECHNICAL FIELD

The present disclosure relates to transmitting live, near-live and recorded datastreams to subscribers.

BACKGROUND

Video on demand (VOD) and audio on demand technologies allow users to select and view/listen to video or audio content at their convenience. On demand systems can be implemented to stream content, which allows a user to view/listen as the content is being streamed, or to download content to a device, such as a computer or digital video recorder (DVR), for viewing/listening at any time. Many internet service providers (ISPs) offer VOD streaming, whereby a user buys or selects video content and it begins to play almost instantaneously, and/or downloading to a DVR for viewing in the future. VOD streaming is a one-way video transmission over a data network, including the Internet, used to play video clips and video broadcasts. Unlike VOD downloading, whereby movie files are played after the entire file has been downloaded and stored, VOD streaming enables videos to be played shortly after only a small amount of content has been received.

A DVR is a device that records video and audio content in a digital format to a disk drive or other memory medium within the device. DVRs include software for personal computers which enables video content capture and playback to and from the memory medium. DVRs can provide the user with functionality, including play, pause, stop, fast-forward and rewind. Such functionality can enable a user to pause a live video content stream for viewing at a later time. Alternatively, a user can record the live video content stream using the DVR and can playback the recorded video content at any time. DVR functionalities also include enabling a user to seek backwards and forwards within the content stream to view previously played and yet unplayed content.

SUMMARY

This specification describes technologies relating to transmitting video and/or audio content to late joining broadcast subscribers. In general, content can be distributed over interconnected network nodes that can selectively transmit, receive, store and display the content. The interconnected network nodes can be either server or client data processing apparatuses, e.g., computers. The server computers can be organized in a multi-tiered server architecture, where ingest servers, e.g., origin servers, reside at the top level and one or more intermediate and/or edge servers reside at one or more lower levels. Client computers can be connected to the multi-tiered server architecture through bottom level servers, e.g., edge servers. Lower level servers and/or client computers, i.e., subscribers, can obtain content transmitted through the multi-tier server communication network. Subscribers can transmit requests for recorded content and/or live datastream broadcast content to upstream servers. Upstream servers can transmit the recorded content and/or the live datastream broadcast content to the client computer even when the client computer was not subscribing to the broadcast at the beginning of the broadcast. The live datastream broadcast can include a plurality of segments. The plurality of segments can be transmitted, upon request, as a near-live feed to one or more subscribers. In response to a request for both recorded content and the live datastream broadcast, the upstream server can transmit the recorded content and can delay transmission of the near-live feed until a new segment of the stream of live data is obtained.

In one aspect a computer-implemented method performed by a server includes obtaining a stream of live data including a plurality of segments. The plurality of segments are stored to form a recorded stream. The plurality of segments are transmitted as a near-live feed to one or more nodes in a network. The recorded stream is transmitted to another node in the network. Transmission of the recorded stream to the another node transitions to the near-live feed. The transmission of the near-live feed to the another node is delayed until a new segment of the stream of live data is obtained.

This and other aspects, can be implemented in systems and computer program products, encoded on a computer-readable medium, operable to cause data processing apparatus to perform such operations and can include one or more of the following features. Obtaining the stream of live data comprising the plurality of segments can include segmenting the stream of live data to form the plurality of segments. Each segment of the plurality of segments can be defined by a configurable interval. The configurable interval can have an upper limit and a lower limit. The upper limit can depend upon time and/or data size. The lower limit can depend upon bitrate and/or content type or packaging. The transitioning can occur in response to a request for the near-live feed from the another node in the network. The network can include a multi-tier server architecture. The multi-tier server architecture can include an origin server at the top level and one or more servers at a lower level. The origin server can be connected to at least one of the one or more servers.

Particular implementations of the subject matter described in this specification can be implemented to realize one or more of the following advantages. Late joining broadcast subscribers can obtain previously broadcasted content. In addition, subscribers can access previously recorded portions of a live datastream broadcast without subscribing to the datastream broadcast from the beginning. For example, broadcast subscribers can view the beginning of a broadcast even though the subscribers did not subscribe to the broadcast until, e.g., half-way through the broadcast.

Moreover, broadcast subscribers can obtain recorded content not existing on local servers from distant upstream servers. Additionally, broadcast subscribers can view both the recorded content and the live datastream broadcast. Broadcast subscribers can seek to any position within the recorded datastream. In addition, broadcast subscribers can pause the live datastream broadcast. Broadcast subscribers can continue to receive additional live datastream broadcast content after making a single request for the live datastream broadcast.

Moreover, segmenting the live datastream broadcast into a plurality of segments can prevent extended delays in transmitting the live datastream broadcast. The plurality of segments can be transmitted as a near-live feed to one or more subscribers. Therefore, playback of the near-live feed at the client computer need only be suspended for as long as it takes a new segment to become obtainable. The segment size can be defined by a configurable interval. For example, the configurable interval can be defined by a maximum duration in seconds and/or a maximum kilobyte size.

Moreover, late joining intermediate and/or edge servers can obtain previously broadcasted content. Accommodating late joining intermediate and/or edge servers can provide significant improvements for large-scale deployment of live datastream broadcasting. Further, storing the recorded content in the memory cache of the intermediate and/or edge servers can alleviate storage space issues. In addition, older broadcast content segments can be pushed out of the memory cache when the memory cache reaches a configurable storage limit. Further, segmenting the live datastream can increase the efficiency in transmitting the near-live feed content to downstream subscribers. Furthermore, broadcast subscriber experiences are enhanced.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
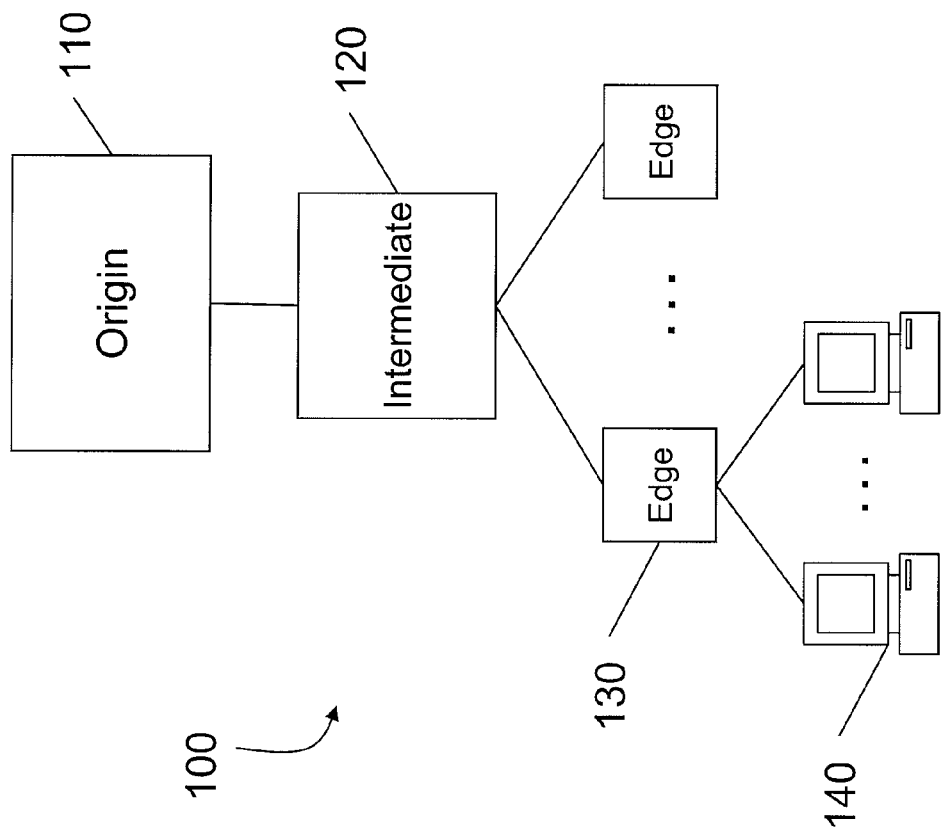
FIGS. 1-2 show examples of multi-tier server architectures.

FIG. 1 shows an example of a multi-tier server architecture 100. The multi-tier server architecture 100 includes multiple network nodes. The multi-tier server architecture 100 can be implemented to include three levels of servers 110-130 and client computers 140. The multi-tier server architecture 100 can be implemented to transmit a datastream to the client computers 140. The datastream can be a live datastream broadcast, a near-live feed, and/or a recorded datastream. The live datastream broadcast can include a plurality of segments. Each of the plurality of segments can include a plurality of video frames and/or audio samples. The plurality of segments can be transmitted as a near-live feed to servers 120, 130 and the client computers 140. In addition, the multi-tier server architecture 100 can be implemented to transmit a recorded datastream to the client computers 140. The recorded datastream can be formed by storing the plurality of segments. Three types of servers can reside in the multi-tier server architecture 100: an origin server 110; one or more intermediate servers 120; and one or more edge servers 130. A server can be any computer or system of computers programmed to send data. In some implementations, the multi-tier server architecture 100 can be implemented in a static tree server structure. In a static tree server structure, downstream servers can transmit requests for content to directly connected upstream servers; downstream servers do not use efficiency algorithms to search for the 'best' upstream server. Servers more proximal to the origin server 110 are upstream servers. Servers that are more distal from the origin server 110 are downstream servers.

The origin server 110 resides at the top level of the multi-tier server architecture 100. The origin server 110 can act as an ingest server and can receive live video, audio and video/audio combinations for broadcast. The origin server 110 can obtain a live datastream including a plurality of segments. In some implementations, the origin server 110 can obtain the datastream by receiving the live data and segmenting the live data into the plurality of segments. In other implementations, the live data can already be segmented when the datastream is obtained by the origin server 110. The origin server 110 can transmit the segmented live datastream as a near-live feed to intermediate server 120 directly. The origin server 110 can transmit the segmented live datastream as a near-live feed to the one or more edge servers 130 and client computers 140 indirectly through communication network connections in the multi-tier server architecture 100. The live datastream, pre- and/or post-segmentation, can be recorded by a recording device operatively coupled to the origin server 110 and transferred to the origin server 110 via a communication port, i.e., USB, Bluetooth, Ethernet, wireless Ethernet. The live datastream can be stored at the origin server 110.

The intermediate server 120 can reside at the second level of the multi-tier server architecture 100. The intermediate server 120 is connected to the origin server 110 through a communication network connection. The intermediate server 120 can obtain content from the origin server 110. The obtained content can include the live datastream, the near-live feed and/or the recorded datastream. The intermediate server 120 can store at least a portion of the near-live feed and the recorded datastream locally. In some implementations, the intermediate server 120 can store the content in a memory cache of the intermediate server 120. As additional content is added to and stored in the intermediate server 120 memory cache, older content segments can be displaced when the capacity of the memory cache reaches a configurable storage limit. The intermediate server 120 can transmit the obtained content directly to one or more of the edge servers 130 and indirectly to the client computers 140 through the multi-tier server architecture 100. The intermediate server 120 can be implemented to transmit a request for content to the origin server 110.

The one or more edge servers 130 can reside at the third level of the multi-tier server architecture 100. The edge servers 130 are connected to the intermediate server 120 through a communication network connection. The edge servers 130 can obtain content from the intermediate server 120. The obtained content can include the live datastream, the near-live feed and/or the recorded datastream. The edge servers 130 can store at least a portion of the near-live feed and the recorded datastream locally. In some implementations, the edge server 130 can store the content in a memory cache of the edge server 130. As additional content is added to and stored in the edge server 130 memory cache, older content segments will be displaced when the capacity of the memory cache reaches a configurable storage limit. The edge servers 130 can transmit the obtained content directly to client computers 140. The edge servers 130 can be implemented to transmit a request for content to the intermediate server 120. In some implementations, the edge servers 130 can have the same functionalities as the intermediate server 120, and thus can be interchangeable with the intermediate server 120.

The client computers 140 are connected to the edge servers 130 through a communication network connection. The client computers 140 can obtain content from the edge servers 130. The obtained content can include the live datastream, the near-live feed and/or the recorded datastream. The client computers 140 can store at least a portion of the obtained content locally, e.g. in a buffer. The client computers 140 can be operated by users that can request the recorded datastream, the live datastream, and/or the near-live feed from the edge servers 130.

If the requested content is available locally at an edge server 130, the edge server 130 can transmit the requested content to the requesting client computer 140. If the requested content is not available locally at the edge server 130, the edge server 130 can transmit a request for the content to an upstream server, e.g., the intermediate server 120. If the requested content is available locally at the intermediate server 120, the intermediate server 120 can transmit the requested content downstream to the edge server 130. The edge server 130 can store the requested content locally and can transmit the requested content to the client computer 140.

However, if the requested content is not available locally at the intermediate server 120, the intermediate server 120 can transmit a request for the content to an upstream server, e.g., the origin server 110. The origin server 110 can have access to both live and recorded datastreams at a local storage device, e.g., the origin server 110 memory. The origin server 110 can store live and recorded content in memory once the content is available and obtained by the origin server 110. The origin server 110 can transmit the requested content downstream to the intermediate server 120. The intermediate server 120 can store the requested content locally and can transmit the requested content to one or more of the edge servers 130. The edge server 130 can store the requested content locally and can transmit the requested content to one or more of the client computers 140. Upon receipt of the requested content, the client computers 140 can display the content on a display device coupled to the client computers 140.

Figure 2:
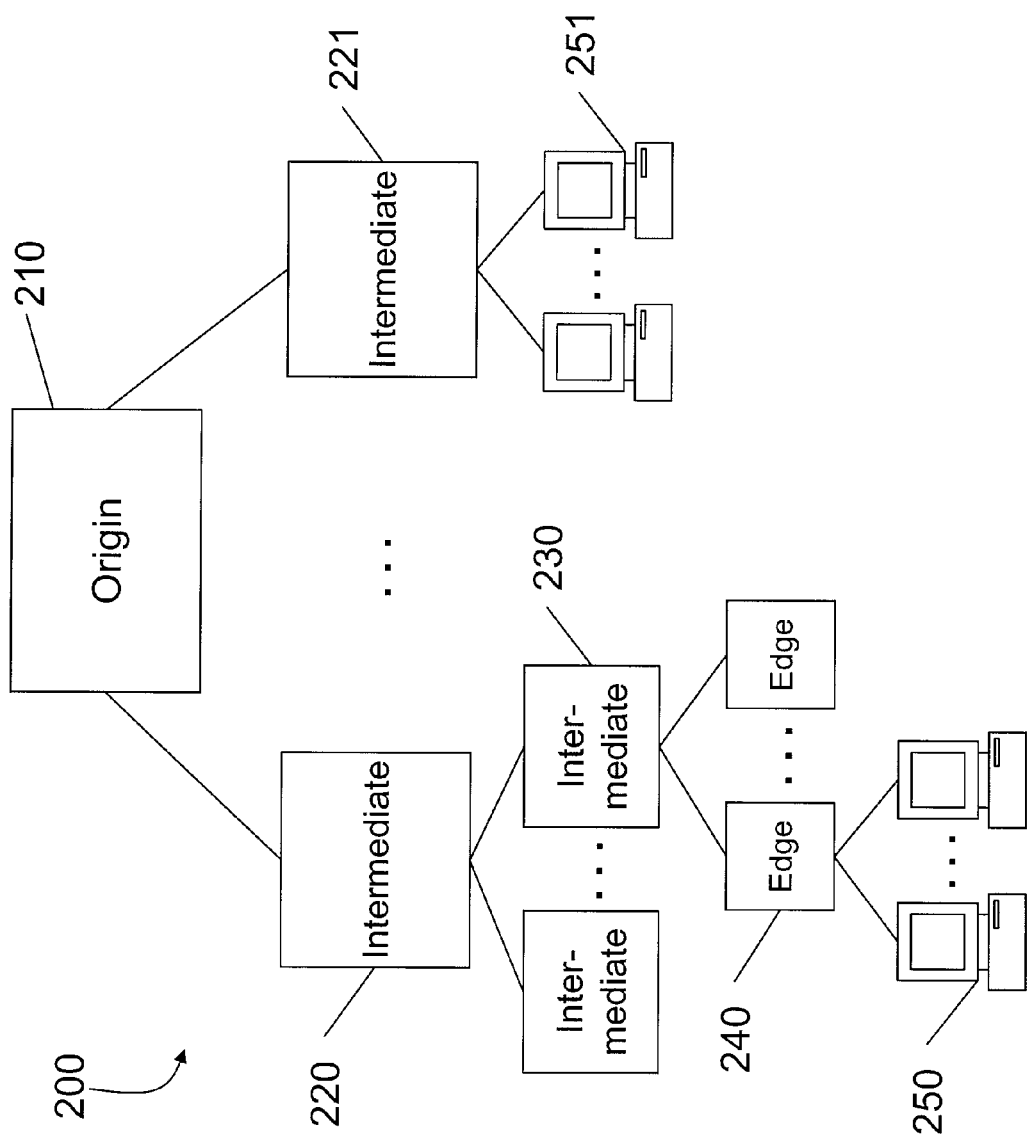

FIG. 2 shows an example of a multi-tier server architecture 200. The multi-tier server architecture 200 includes multiple network nodes. Network nodes 210-240 are one or more server data processing apparatuses, e.g., computers, and network node 250 is one or more client computers. The multi-tier server architecture 200 can be implemented to include more than three levels of servers. For example, the multi-tier server architecture 200 can be implemented to include an origin server 210 at the top level, one or more intermediate servers 220 at a second level, one or more intermediate servers 230 at a third level, one or more edge servers 240 at a fourth level and one or more client computers 250. The servers 210-240 and the client computers 250 are connected via communication network connections. Each server can selectively obtain, transmit and store content. Each client computer can obtain, display and view content. Users at the client computers 250 can request content from the nearest server, e.g., one of the one or more edge servers 240. The edge server 240 can transmit the content to one or more of the client computers 250 when the content is stored locally, and can transmit a request for the requested content to the upstream intermediate server 230 when the content is not available locally. Requests for the content can continue to be transmitted upstream until the requested content is determined to be available in storage. Once the content is determined to be available, the requested content can be transmitted downstream through the multi-tree server architecture 200 to the client computers 250.

In an alternative implementation, the multi-tier server architecture 200 can be implemented to include less than three levels of servers. For example, the multi-tier server architecture 200 can be implemented to include an origin server 210 at the top level, one or more intermediate servers 221 at a second level and one or more client computers 251. The servers 210 and 221 and the client computers 251 are connected via communication network connections. Users at the client computers 251 can request content from the intermediate server 221. The intermediate server 221 can transmit the content to the one or more client computers 251 when the content is stored locally, and can transmit a request for the requested content to the upstream origin server 210 when the content is not available locally. The origin server 210 can transmit the requested content downstream through the intermediate server 221, and ultimately to the client computers 251.

Figure 3:
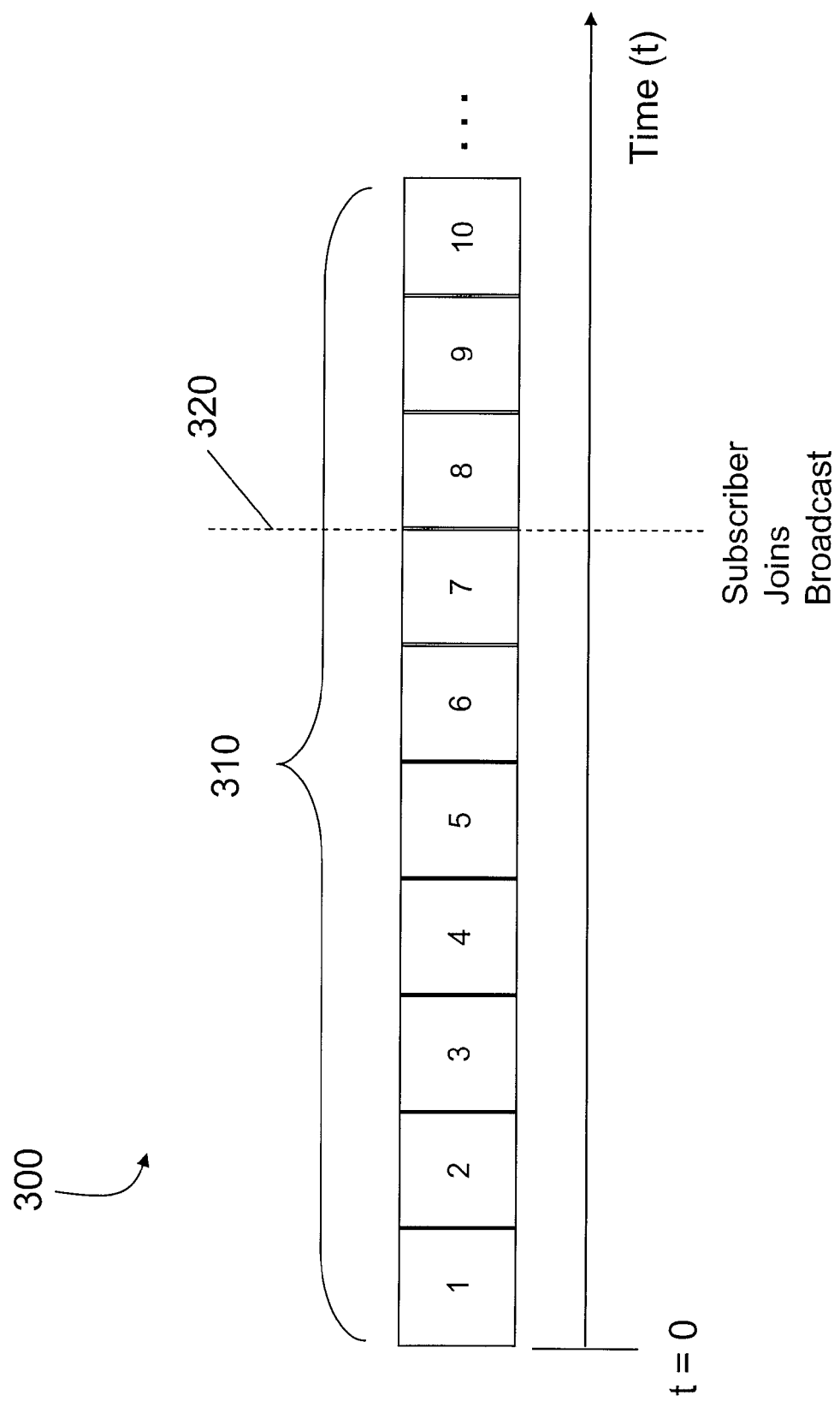
FIG. 3 shows an example datastream broadcast timeline.

FIG. 3 shows an example datastream broadcast timeline 300. At time t=0, a live datastream broadcast 310 can commence. The live datastream broadcast 310 can be obtained at the origin server of a multi-tier server architecture. A live stream encoder, i.e., a publisher, can transmit the live datastream broadcast 310 to the origin server. The live datastream broadcast 310 can include a plurality of segments 1-10. The plurality of segments 1-10 can be stored at the origin server. The plurality of segments 1-10 can be transmitted from the origin server to one or more nodes in a network, including servers and/or client computers, upon request. The one or more nodes can subscribe to the live datastream broadcast 310 by transmitting a request for broadcast content. The one or more nodes can subscribe from the beginning of the broadcast or can join the broadcast already in progress as a, i.e., late joining subscriber. Upon receipt of the plurality of segments 1-10 at any server in the multi-tier server architecture, the plurality of segments 1-10 can be transmitted to one or more nodes in the network as a near-live feed. The near-live feed can be transmitted to one or more network nodes as soon as the plurality of segments 1-10 are obtained by and stored locally at any server in the multi-tier server architecture.

In some implementations, the origin server segments the live datastream broadcast 310 as the live datastream broadcast 310 is obtained. Thus, the near-live feed is not transmitted to one or more downstream network nodes instantaneously because of the inherent delay in segmenting the live datastream broadcast 310 before transmitting. For example, if the configurable interval time duration for the segment size of the plurality of segments 1-10 is set at three seconds, the live datastream broadcast 310 will be segmented into three-second segments at the origin server, and will be transmitted as a near-live feed to the one or more downstream network nodes after the three-second segment of the live datastream broadcast 310 has been obtained. The plurality of segments 1-10 can be stored at the origin server, and at the one or more downstream network nodes as a recorded datastream. The recorded datastream also can be transmitted to other nodes in the network.

At 320, a client computer can join the broadcast as a, i.e., late joining subscriber. At 320, the plurality of segments 1-7 have already been obtained, segmented and stored at least one node in the network. The plurality of segments 1-7 can be transmitted as a near-live feed from t=0 to one or more nodes in the network. Although the subscriber joined the broadcast after the plurality of segments 1-7 were obtained by and transmitted to one or more network nodes, the subscriber can still obtain the plurality of segments 1-7 by transmitting a request from the client computer upstream to, e.g., an edge server. If the edge server had been receiving the near-live feed from t=0—due to fulfilling a request for the content from another downstream client computer—and storing the plurality of segments 1-7, the edge server can transmit the plurality of segments 1-7 as a recorded datastream to the subscriber. However, if the edge server had not been receiving the near-live feed from t=0, but had obtained the plurality of segments from the fourth segment until the time at 320, upon receiving a request from the client computer for the fifth segment, the edge server can transmit the fifth segment to the client computer. Because the edge server had already obtained and stored the fifth segment locally, the edge server can transmit the fifth segment to the client computer nearly instantaneously upon receiving a request for the content from the client computer.

Late joining subscribers can receive recorded datastream content, near-live feeds and/or live datastream broadcasts. In some implementations, the live datastream broadcast can be transmitted without being segmented into a plurality of segments. However, if the live datastream broadcast content is not segmented, late joining subscribers will not be able to obtain earlier portions of the datastream. Thus, the segmentation of the live datastream broadcast can enable late joining subscribers to obtain content transmitted through the communication network before the late joining subscriber subscribed to the broadcast.

In some implementations, in order to playback the content from the second segment to the time at 320 at the client computer, a user at the client computer can transmit a request for content corresponding to the beginning of the second segment to the edge server. Because the edge server started obtaining content from the fourth segment until the time at 320, the edge server does not have the requested second and third segments stored locally. Therefore, the edge server can transmit a request for the second and third segments upstream to a first intermediate server. If the first intermediate server does have the requested content stored locally, the first intermediate server can transmit the requested content to the edge server. As the requested content is received at the edge server, the edge server can store a copy of the requested content locally and also can transmit the requested content to the requesting client computer. However, if the first intermediate server does not have the requested content stored locally, the intermediate server also can transmit a request for the second and third segments upstream. The upstream request from the first intermediate server can be received by another intermediate server, or the origin server, depending on the number of levels in the multi-tier server architecture. The upstream server, i.e., the another intermediate server or the origin server, can retrieve the content from local storage and can transmit the content downstream to the first intermediate server, and then to the edge server, and finally to the requesting client computer.

Thus, in some implementations, a downstream server, e.g., an edge server, can receive a request for datastream content from a client computer at a specified point in time. If the requested content is stored locally at the edge server, the edge server can transmit the data to the requesting client computer. If the requested content is not available locally, the edge server can transmit a request for the content to an upstream server, e.g., an intermediate server. If the request is for content from a recorded datastream and the recorded datastream content is available at the intermediate server, the intermediate server can retrieve the content and can transmit the requested content to the edge server, which in turn can transmit the content to the requesting client computer. However, if the request is for the current segment of a live datastream, i.e., the client computer is requesting a near-live feed, the edge server can wait to begin the transmission of the current segment of the live datastream to the client computer until the current segment has been fully received at the edge server. For example, if the request is for the current segment of a near-live feed which is already being received at the edge server, but is not yet fully received, when the client request is received, the edge server can wait to begin transmission of the current segment to the requesting client until the current segment is fully received.

Due to the static tree server structure of the multi-tier server architecture, upstream servers can have more content stored locally than downstream servers. Downstream servers can transmit requests to upstream servers for content that is not stored locally at the downstream server. Content can be transmitted from upstream servers to downstream servers. Therefore, downstream servers, in response to a request from a client computer, can obtain at least a portion of the recorded plurality of segments 1-7 by transmitting a request for at least a portion of the plurality of segments 1-7 to the most proximate upstream server. If the most proximate upstream server does not have the requested content stored locally, the most proximate upstream server can transmit a request for the content to its most proximate upstream server, and so on, until the requested content is located in a storage device of an upstream server. Once the requested content is located, the requested content can be transmitted downstream through the multi-tier server architecture until the requested content is obtained by the requesting client computer.

The subscriber can obtain the plurality of segments 1-7 when he joins the broadcast at 320, and in addition, the subscriber can transmit a request to obtain the live datastream broadcast 310, and thus obtain segments eight, nine, ten, etc. as they become obtainable. The subscriber can transmit a request to an upstream server to obtain the live datastream broadcast 310 as a near-live feed. The live datastream broadcast 310 can be segmented at the origin server into a plurality of segments. The duration of the segment size can be determined according to the configurable interval for the segmentation. As each segment of the plurality of segments is obtained, the origin server can transmit the obtained segment to the requesting downstream servers and client computers as a near-live feed. For example, at 320 the subscriber can join the broadcast and can transmit a request upstream for the live datastream broadcast; as soon as the configurable interval time duration for segment eight of the live datastream broadcast is obtained at the origin server, the origin server can transmit segment eight through the multi-tier server architecture as a near-live feed to the requesting client computer. In addition, segments nine, ten, etc. can be transmitted automatically to the client computer upon the client computer transmitting the initial request for the live datastream broadcast at 320.

The duration of the plurality of segments 1-10 is configurable. Thus, the segment size can be defined by a configurable interval. The configurable interval can be defined by a maximum duration in seconds and/or a maximum kilobyte size. For example, the live datastream broadcast 310 can be segmented into five second content segments. After each of the five second content segments has been obtained, it can be stored. The segment duration can be any value. In another example, the live datastream broadcast 310 can be segmented into 256 kilobyte content segments. Thus, after a 256 kilobyte content segment has been obtained, it can be stored locally and transmitted downstream to a requesting server and/or client computer. The segment size can be any value. Alternatively, the lower limit of the configurable interval can be defined by a minimum bitrate value. The segment bitrate value can be as small as the minimum frame/sample packaging size for the type of content.

The obtained content can be displayed on a display device coupled to the client computer. The user can view the content on the display device. Input/output devices, e.g., a keyboard or pointing device, can be coupled to the client computer and can be used to manipulate the content. For example, the content can be displayed in, e.g., a graphical user interface or browser window, and the playback of the content can be controlled through one or more media playback buttons, such as play, pause and stop. In addition, other playback functionalities can enable a user to seek forwards or backwards within the content and to jump from viewing a recorded datastream to viewing a near-live feed of a live datastream broadcast.

In some implementations, a subscriber can request the content of a recorded datastream and the content of a live datastream. For example, if a baseball game is being broadcast through the multi-tier server architecture, a user could desire to view the first three innings of the game to see the starting pitchers before desiring to view the present action in the game. The subscriber can thus transmit a request for the first three innings of the game to an upstream server, e.g., an edge server. If the edge server has the requested plurality of segments stored locally—for example, because another client computer previously requested the same plurality of segments and those plurality of segments remain in the memory cache of the edge server—the edge server can transmit the content comprising the first three innings of the game, e.g., the plurality of segments 1-3. The user can display and view the first three innings on the client computer display device.

After viewing the plurality of segments 1-3, the subscriber can transmit a request upstream through the multi-tier server architecture for the live datastream broadcast originating at the origin server. Alternatively, the subscriber can transmit a request for the recorded datastream and the live datastream broadcast concurrently. The origin server does not transmit any segment of the live datastream broadcast as a near-live feed through the multi-tier server architecture until the origin server has obtained a complete segment of the stream of live data. The first complete segment of the live datastream broadcast obtained after the request from a downstream node can be a new segment and can be the first segment ready for transmission to downstream nodes as a near-live feed. For example, if the configurable interval for the segment size of the plurality of segments is five seconds, although the origin server can receive a request for the live datastream at one second into the obtainment of the live datastream broadcast, the origin server does not transmit the new segment until it has obtained a complete five second segment. The subscriber can receive, display and view the new segment. Additionally, segments subsequent the new segment can be automatically transmitted downstream to the client computer after the initial request for the live datastream broadcast. The subscriber can experience a delay between the time the subscriber transmitted a request for the live datastream broadcast and the obtainment of the new segment. The delay will only occur upon the initial request for the live datastream broadcast because by the time the subscriber receives, displays and views the full five seconds of the new segment, a subsequent five second segment will be available and obtainable at the client computer.

Figure 4:
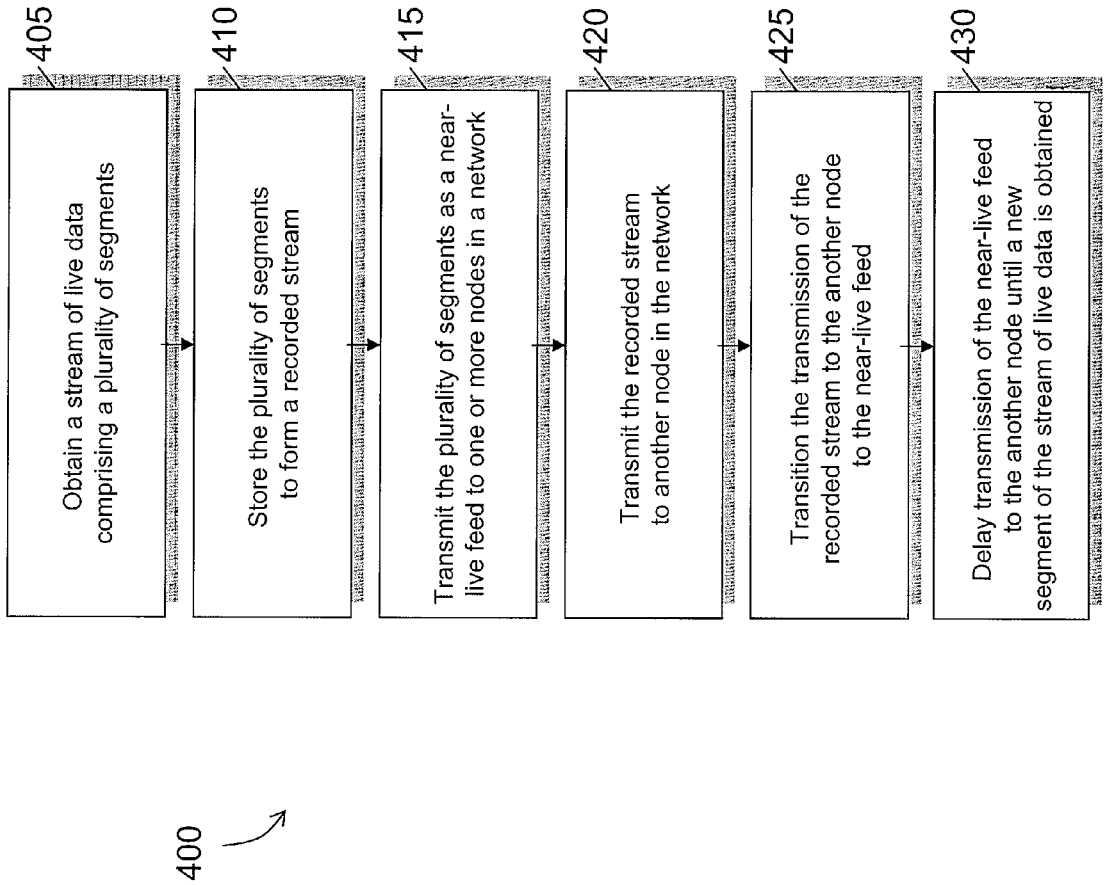
FIG. 4 shows a flowchart of an example process for transmitting datastream content to broadcast subscribers.

FIG. 4 shows a flowchart of an example process 400 for accommodating late joining broadcast users. The process 400 can, for example, be implemented in the multi-tier server architectures 100, 200 depicted in FIGS. 1 and 2, respectively.

A stream of live data comprising a plurality of segments can be obtained (405). The stream of live data can be obtained by an ingest server, i.e., an origin server. The origin server can obtain the stream of live data from a recording device connected to the origin server. Alternatively, the stream of live data can be obtained by one or more intermediate servers and/or one or more edge servers in a multi-tier server architecture. The stream of live data can be segmented into a plurality of segments at the origin server. The plurality of segments can be transmitted as a near-live feed to one or more multi-tier server architecture subscribers. The segment size of the plurality of segments can be defined by a configurable interval. The configurable interval can be defined by a maximum duration in time and/or maximum data size, or both. For example, the maximum duration of time for each segment of the plurality of segments can be five seconds of the live datastream broadcast. The duration of time constraint can be tied to the bandwidth value of the content. Bandwidth value can be inversely related to the maximum time duration of each segment. Thus, for example, when the bandwidth content is high, the configurable time interval can be low, e.g., 0.5 seconds, whereas when the bandwidth content is low, the configurable time interval can be high, e.g., five seconds.

The plurality of segments can be stored to form a recorded stream (410). The plurality of segments can be stored at the origin server. Additionally, the plurality of segments can be stored at the one or more intermediate servers and/or the one or more edge servers. The plurality of segments can be stored in a local storage device operatively coupled to any of the one or more multi-tier servers. Alternatively, the plurality of segments can be shared over a communication network for storing on a remote storage device. The recorded stream can include a portion of the plurality of segments obtained, or the entirety of the plurality of segments obtained. The origin server can store the entirety of the plurality of segments obtained at the origin server. In some implementations, at least one of the one or more multi-tier servers can store the recorded stream locally, e.g., in a buffer.

The plurality of segments can be transmitted as a near-live feed to one or more nodes in a network (415). The plurality of segments can be transmitted to the one or more nodes in the network in response to a request from at least one of the one or more nodes. The one or more nodes in the network can include server and client computers. The network can be implemented in a multi-tier server architecture. The multi-tier server architecture can include an origin server at the top level and one or more servers at one or more lower levels. The one or more servers can include one or more intermediate servers and/or one or more edge servers. The origin server can be connected to at least one of the one or more servers at the one or more lower levels. The multi-tier server architecture can be implemented as a static tree server structure wherein the connections between upstream servers and downstream servers is static. Downstream servers, due to the nature of the multi-tier server architecture, can transmit requests to upstream servers for content. The content can be transmitted in near real-time, discounting the computing delays associated with transmitting digital data through a multi-tier server architecture as well as the delay in segmenting the stream of live data.

The recorded stream can be transmitted to another node in the network (420). The recorded stream can be transmitted to the another node in the network in response to a request from the another node. The another node can be a server computer or a client computer. The another node can transmit a request for the recorded stream to an upstream server. For example, if the another node is a client computer, the client computer can request the recorded stream from its most proximate server, e.g., an edge server. The edge server can transmit the recorded stream to the client computer if the recorded stream is stored at the edge server. In another example, if the another node is a server computer, e.g., an intermediate server, the intermediate server can request the recorded stream from its most proximate server, e.g., an origin server. The origin server can transmit the recorded stream to the intermediate server. The another node can receive the recorded stream even if the another node did not join the live datastream broadcast at the beginning of the streaming.

The transmission of the recorded stream to the another node can be transitioned to the near-live feed (425). The transition in transmission from the recorded stream to the near-live feed can occur in response to a request for the stream of live data from the another node in the network. The another node can be a server computer or a client computer joining a live datastream broadcast already in progress. For example, a client computer can transmit a request to an upstream server, e.g., an edge server, for a portion of a recorded stream and after receiving and displaying the portion of the recorded stream, the client computer can transmit a request to the edge server for the near-live feed. The edge server can transition from transmitting the portion of the recorded stream to the client computer to transmitting the near-live feed to the client computer. In another example, an intermediate server can transmit a request to an origin server for at least a portion of the recorded stream and after receiving at least the portion of the recorded stream, the intermediate server can transmit a request to the origin server for the near-live feed. The origin server can transition from transmitting the recorded stream to the intermediate server to transmitting the near-live feed to the intermediate server.

The transmission of the near-live feed can be delayed until a new segment of the stream of live data is obtained (430). The near-live feed can be transmitted to the another node. The near-live feed is not transmitted to the another node until a new segment of the stream of live data is obtained at an upstream server. For example, in response to a request for the near-live feed from an intermediate server, the origin server does not transmit the near-live feed until a new segment is obtained. Thus, if the configurable interval for the segment size of the plurality of segments is four seconds, the origin server does not transmit the near-live feed until four seconds of the live datastream broadcast have been obtained and segmented at the origin server. Alternatively, if the configurable interval for the segment size of the plurality of segments is 1024 kilobytes of data, the origin server does not transmit the near-live feed until 1024 kilobytes of the live datastream broadcast have been obtained and segmented at the origin server. The smaller the configurable interval, and hence the smaller the segment size for each of the plurality of segments, the quicker the transmission response time. For example, the delay in transmission can be decreased by changing the configurable interval for the segment size of the plurality of segments from four seconds to two seconds. By decreasing the configurable interval, the requesting server or client computer will obtain the near-live feed with less delay.

Figure 5:
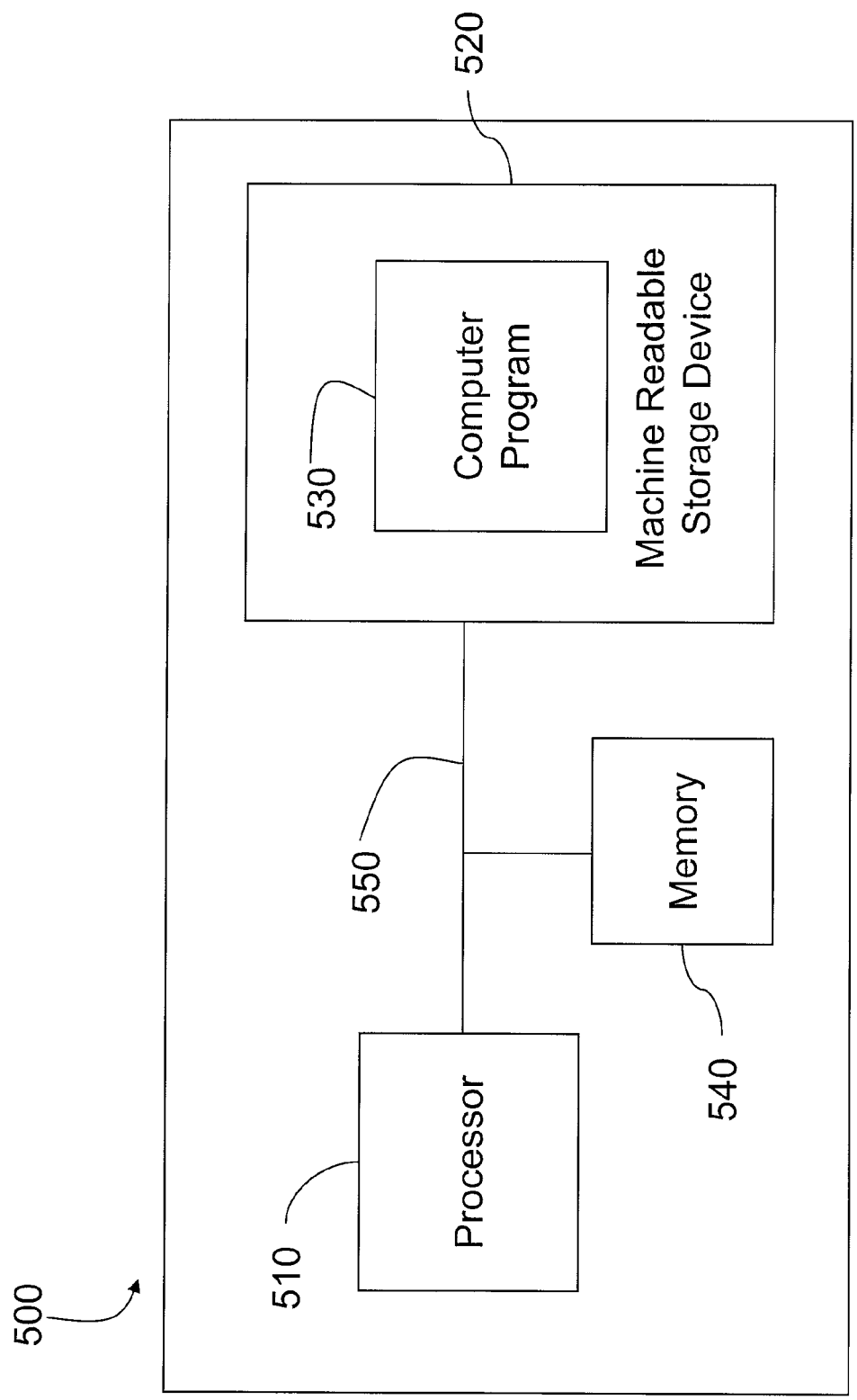
FIG. 5 is a schematic diagram of an example computer system that can be utilized to implement the systems and methods described herein.

FIG. 5 is a schematic diagram of an example computer system 500 that can be utilized to implement the systems and methods described herein. The system 500 includes a processor 510, a machine-readable storage device 520, a computer program 530, and a memory 540. Each of the components 510, 520, 530, and 540 can, for example, be interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 540 or on the machine-readable storage device 520.

The memory 540 stores information within the system 500. In some implementations, the memory 540 is a volatile memory unit. In some implementations, the memory 540 is a non-volatile memory unit. The machine-readable storage device 520 is capable of providing mass storage for the system 500. In various implementations, the machine-readable storage device 520 can, for example, include a hard disk device, an optical disk device, or some other large capacity storage device.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks;

magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results. In some implementations, the plurality of segments can be transmitted to downstream subscribers through alternate channels, such as HTTP download.

What is claimed is:

1. A computer-implemented method performed by a server, the method comprising:
   obtaining a stream of live data comprising a plurality of segments;
   storing the plurality of segments to form a recorded stream;
   transmitting the plurality of segments as a near-live feed to one or more nodes in a network;
   in response to a request for at least a portion of the stream of live data from another node after the transmitting the plurality of segments commenced, transmitting the recorded stream to the another node in the network; and
   transitioning from transmission to the another node of the recorded stream to the near-live feed, the transmission comprising:
      delaying transmission of the near-live feed to the another node until a new segment of the stream of live data is obtained.

2. The computer-implemented method of claim 1, wherein obtaining the stream of live data comprising the plurality of segments includes segmenting the stream of live data to form the plurality of segments.

3. The computer-implemented method of claim 1, wherein each segment of the plurality of segments is defined by a configurable interval, the configurable interval having an upper limit and a lower limit.

4. The computer-implemented method of claim 3, wherein the upper limit depends upon time and/or data size.

5. The computer-implemented method of claim 3, wherein the lower limit depends upon bitrate and/or content type or packaging.

6. The computer-implemented method of claim 1, wherein the transitioning occurs in response to a request for the near-live feed from the another node in the network.

7. The computer-implemented method of claim 1, wherein the network includes a multi-tier server architecture, the multi-tier server architecture including an origin server at a top level and one or more servers at a lower level, the origin server being connected to at least one of the one or more servers.

8. The computer-implemented method of claim 1, further comprising:
   transitioning from transmission to the another node of the near-live feed to the recorded stream.

9. A computer-program product, encoded on a non-transitory computer-readable medium, operable to cause data processing apparatus to perform operations comprising:
   obtaining a stream of live data comprising a plurality of segments;
   storing the plurality of segments to form a recorded stream;
   transmitting the plurality of segments as a near-live feed to one or more nodes in a network;
   in response to a request for at least a portion of the stream of live data from another node after the transmitting the plurality of segments commenced, transmitting the recorded stream to the another node in the network; and
   transitioning from transmission to the another node of the recorded stream to the near-live feed, the transmission comprising:
      delaying transmission of the near-live feed to the another node until a new segment of the stream of live data is obtained.

10. The computer-program product of claim 9, wherein obtaining the stream of live data comprising the plurality of segments includes segmenting the stream of live data to form the plurality of segments.

11. The computer-program product of claim 9, wherein each segment of the plurality of segments is defined by a configurable interval, the configurable interval having an upper limit and a lower limit.

12. The computer-program product of claim 11, wherein the upper limit depends upon time and/or data size.

13. The computer-program product of claim 11, wherein the lower limit depends upon bitrate and/or content type or packaging.

14. The computer-program product of claim 9, wherein the transitioning occurs in response to a request for the near-live feed from the another node in the network.

15. The computer-program product of claim 9, wherein the network includes a multi-tier server architecture, the multi-tier server architecture including an origin server at a top level and one or more servers at a lower level, the origin server being connected to at least one of the one or more servers.

16. The computer-program product of claim 9, further comprising:
   transitioning from transmission to the another node of the near-live feed to the recorded stream.

17. A system performed by a server, the system comprising:
   one or more nodes in a network; and
   at least one server configured to perform operations, comprising:
      obtaining a stream of live data comprising a plurality of segments;
      storing the plurality of segments to form a recorded stream;
      transmitting the plurality of segments as a near-live feed to the one or more nodes in the network;
      in response to a request for at least a portion of the stream of live data from another node after the transmitting the plurality of segments commenced, transmitting the recorded stream to the another node in the network; and
      transitioning from transmission to the another node of the recorded stream to the near-live feed, the transmission comprising:
         delaying transmission of the near-live feed to the another node until a new segment of the stream of live data is obtained.

18. The system of claim 17, wherein obtaining the stream of live data comprising the plurality of segments includes segmenting the stream of live data to form the plurality of segments.

19. The system of claim 17, wherein each segment of the plurality of segments is defined by a configurable interval, the configurable interval having an upper limit and a lower limit.

20. The system of claim 19, wherein the upper limit depends upon time and/or data size.

21. The system of claim 19, wherein the lower limit depends upon bitrate and/or content type or packaging.

22. The system of claim 17, wherein the transitioning occurs in response to a request for the near-live feed from the another node in the network.

23. The system of claim 17, wherein the network includes a multi-tier server architecture, the multi-tier server architecture including an origin server at a top level and one or more servers at a lower level, the origin server being connected to at least one of the one or more servers.

24. The system of claim 17, wherein the operations further comprise:
   transitioning from transmission to the another node of the near-live feed to the recorded stream.

\* \* \* \* \*